(12) United States Patent
Kumar et al.

(10) Patent No.: US 11,436,243 B2
(45) Date of Patent: Sep. 6, 2022

(54) DATA HARVESTER

(71) Applicant: International Business Machines Corporation, Armonk, NY (US)

(72) Inventors: Ashwin Kumar, Bangalore (IN); Ankur Bharatkumar Shah, Nanavat (IN); Atul Gore, Pune (IN); Jayanth Gangadhar, Doddaballapur (IN); Vivek Venkatanarasaiah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 16/865,662

(22) Filed: May 4, 2020

(65) Prior Publication Data

US 2021/0342343 A1    Nov. 4, 2021

(51) Int. Cl.
*G06F 16/2458* (2019.01)
*G06N 5/02* (2006.01)
*G06N 20/00* (2019.01)

(52) U.S. Cl.
CPC .......... *G06F 16/2465* (2019.01); *G06N 5/02* (2013.01); *G06N 20/00* (2019.01)

(58) Field of Classification Search
CPC .. G06F 16/2465; G06F 40/123; G06F 16/951; G06N 20/00; G06N 5/02; G06N 5/00; G06N 5/022

USPC ........................................................ 707/776
See application file for complete search history.

(56) References Cited

U.S. PATENT DOCUMENTS

| | | | |
|---|---|---|---|
| 8,612,404 B2 | 12/2013 | Bone et al. | |
| 8,818,837 B2 | 8/2014 | McCalmont et al. | |
| 10,223,401 B2 | 3/2019 | Bishop et al. | |
| 2015/0052158 A1* | 2/2015 | Bishop | G06F 16/335 707/754 |
| 2019/0079981 A1* | 3/2019 | Dhayapule | H04L 47/125 |
| 2019/0121898 A1 | 4/2019 | Giresi et al. | |

OTHER PUBLICATIONS

Anonymous, "System and Method for Parallel (On-the-Fly) Data Indexing in Storage Systems", IP.com No. IPCOM000149690D, Apr. 4, 2007.
Anonymous, "An Interactive Clustering Method For Large Scale Data", IP.com No. IPCOM000232499D, Nov. 13, 2013.

* cited by examiner

*Primary Examiner* — Evan Aspinwall
(74) *Attorney, Agent, or Firm* — Aaron N. Pontikos

(57) ABSTRACT

A data harvester enhances compliance audits by characterizing data sources, sampling data in one or more of the data sources to determine likelihood of success of the data harvest, estimating time for the data harvest, making recommendations from the samples based on machine learning relating to previous runs, then sampling additional data while estimated expected completion time. The harvested data may then be analyzed and compared to compliance requirements, and a compliance report may be generated.

14 Claims, 8 Drawing Sheets

DATA HARVESTER

BACKGROUND

1. Technical Field

This disclosure generally relates to database systems, and more specifically relates to harvesting data from databases.

2. Background Art

Many modern organizations, such as companies and government entities, must comply with different laws, regulations and standards, collectively referred to herein as "compliance requirements." Failure to comply with the applicable compliance requirements can subject an organization to fines and/or legal liability for non-compliance. As a result, audits of an organization's systems become necessary to assure compliance with the compliance requirements.

For large organizations, the process of auditing the organization's various information systems, referred to herein as "data sources", can be a very time-consuming process. Many organizations have terabytes or even petabytes of data in their storage across multiple data sources. The process of harvesting, filtering and analyzing data on each data source can take a long time, sometimes multiple months. When an auditor must wait for months for one cycle of harvesting, filtering and analysis, there could be breaches in the regulatory compliance that go undetected for an unacceptable period of time, exposing the organization to potential financial and legal liability.

BRIEF SUMMARY

A data harvester enhances compliance audits by characterizing data sources, sampling data in one or more of the data sources to determine likelihood of success of the data harvest, estimating time for the data harvest, making recommendations from the samples based on machine learning relating to previous runs, then sampling additional data while estimated expected completion time. The harvested data may then be analyzed and compared to compliance requirements, and a compliance report may be generated.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

A data harvester enhances compliance audits by characterizing data sources, sampling data in one or more of the data sources to determine likelihood of success of the data harvest, estimating time for the data harvest, making recommendations from the samples based on machine learning relating to previous runs, then sampling additional data while estimated expected completion time. The harvested data may then be analyzed and compared to compliance requirements, and a compliance report may be generated.

Figure 1:
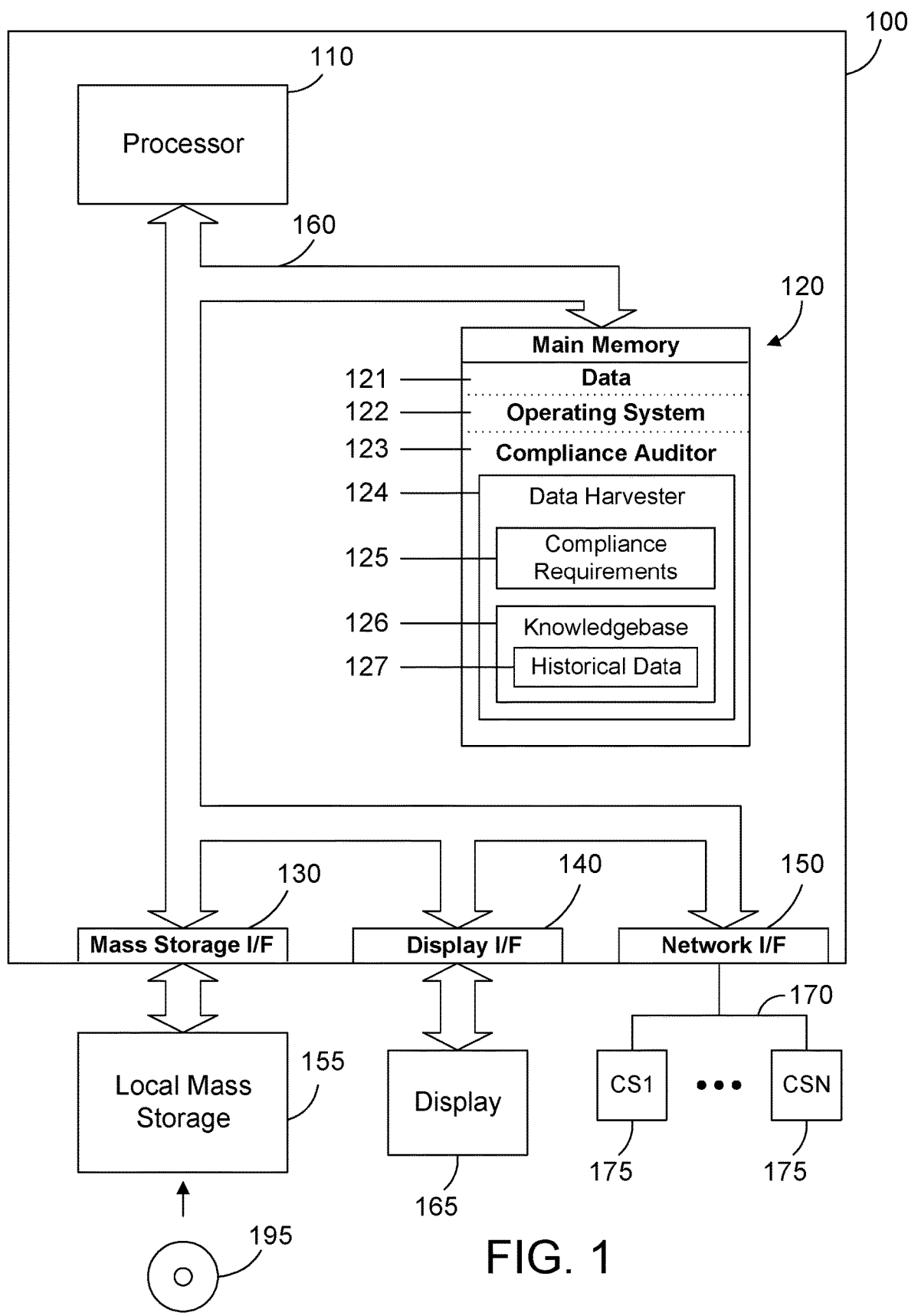
FIG. 1 is a block diagram of a computer system that includes a data harvester.

Referring to FIG. 1, a computer system 100 is one suitable implementation of a computer system that includes a data harvester as described in more detail below. Computer system 100 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such as a flash drive.

Main memory 120 preferably contains data 121, an operating system 122, and a compliance auditor 123 that includes a data harvester 124. Data 121 represents any data that serves as input to or output from any program in computer system 100. Operating system 122 is a multitasking operating system, such as AIX or LINUX. The compliance auditor 123 uses the data harvester 124 to harvest data from data sources, then determine whether the harvested data meets the compliance requirements 125. A knowledgebase 126 stores historical data 127 related to one or more previous runs of the data harvester. The historical data 127 allows the data harvester to apply machine learning to the historical data to make recommendations for the data harvester 124. While the compliance requirements 125 and knowledgebase 126 are shown in FIG. 1 as part of the data harvester 124, these could also be separate from the data harvester.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and compliance auditor 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the compliance auditor 123.

Although computer system 100 is shown to contain only a single processor and a single system bus, those skilled in the art will appreciate that a data harvester as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using one or more I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175, shown as CS1, . . . , CSN in FIG. 1, represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter. Of course, network interface 150 can also represent multiple network interfaces.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
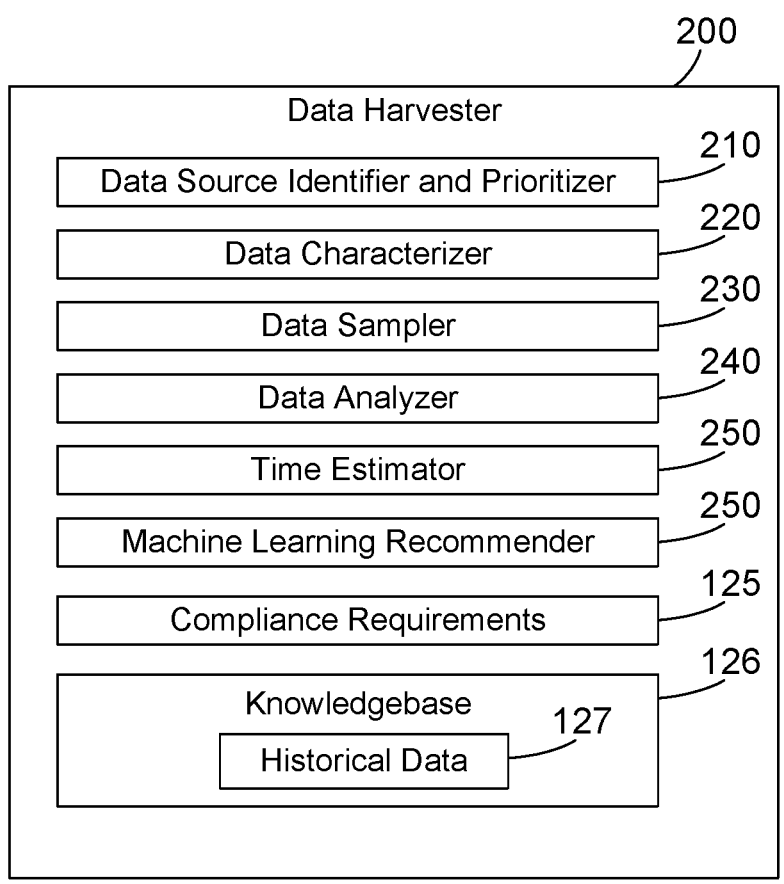
FIG. 2 is a block diagram showing a suitable implementation for the data harvester.

Referring to FIG. 2, data harvester 200 is one suitable implementation for the data harvester 124 shown in FIG. 1. Data harvester 200 preferably includes a data source identifier and prioritizer 210; a data characterizer 220; a data sampler 230; a data analyzer 240; a time estimator 250; a machine learning recommender 250; compliance requirements 125; and knowledgebase 126. The data source identifier and prioritizer 210 crawls through a system to identify the data sources on a target system from which data needs to be harvested, and optionally prioritizes the data sources on the target system. The data characterizer 220 characterizes the data in each data source. The data in each data source can be characterized in any suitable way, including without limitation: type of repository (data source), size of the data source; number of documents; average document size; types of documents stored in the data source; network statistics, connectivity and response times; and for mailboxes, the overall organizational structure, mailbox sizes and attachment percentage within the mailboxes. The data sampler 230 samples data from a data source. The data sampler 230 can take a sample of any suitable size, including a very small sample up to the entire data source. The data analyzer 240 analyzes harvested data and can optionally determine whether the harvested data satisfies the compliance requirements 125. The time estimator 250 estimates the time to completion for the data harvester, and can additionally estimate time to completion for each data source and time to completion for each sample. The machine learning recommender 250 reviews the historical data 127 in the knowledgebase 126 and makes recommendations based on machine learning analysis of the historical data 127.

Figure 3:
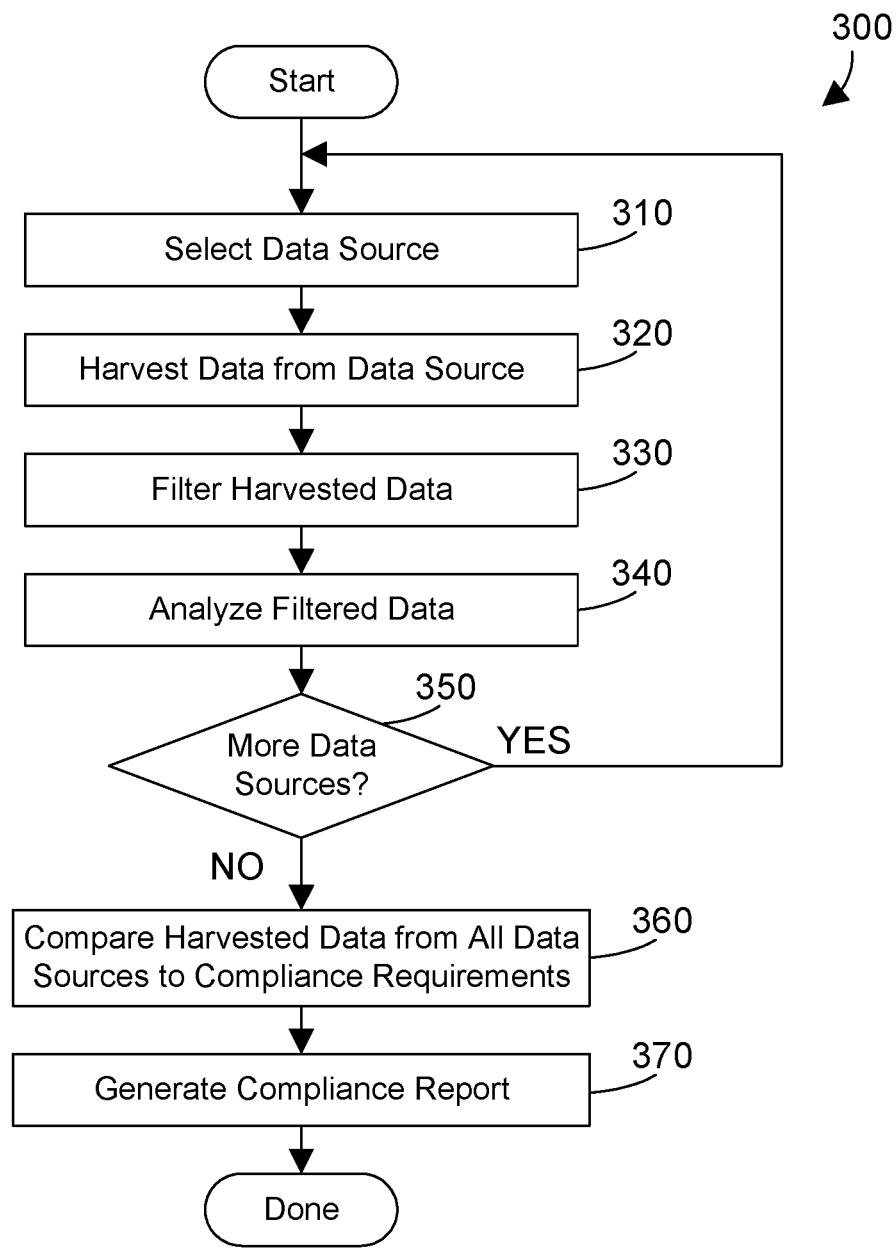
FIG. 3 is a flow diagram of a prior art method for harvesting data and generating a compliance report.

A prior art method 300 for generating a compliance report is shown in FIG. 3. A data source is selected (step 310). Data is harvested from the data source (step 320). The harvested data is filtered (step 330), then analyzed (step 340). When there are more data sources (step 350=YES), method 300 returns to step 310 and continues for the next data source. When there are no more data sources (step 350=NO), the harvested data from all data sources is compared to the compliance requirements (step 360). A compliance report is then generated (step 370). Method 300 is then done.

A problem with prior art method 300 in FIG. 3 is that for large organizations with many data sources that contain large amounts of data, it can take weeks or months to perform steps 310, 320, 330 and 340 for all the data sources. Taking weeks or months to determine compliance can expose the organization to potential financial and/or legal liability due to noncompliance during such a lengthy time period.

Figure 4:
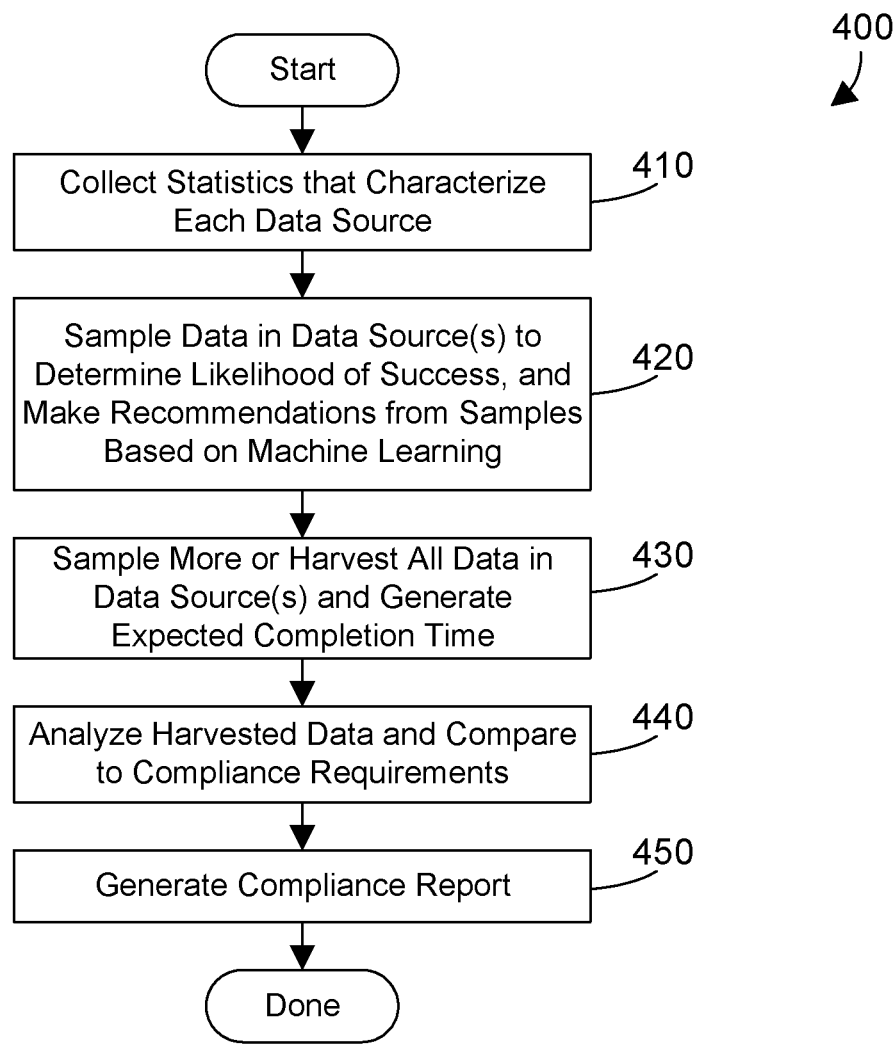
FIG. 4 is a flow diagram of a method in accordance with a preferred embodiments for harvesting data and generating a compliance report.

Referring to FIG. 4, a method 400 in accordance with a preferred embodiment collects statistics that characterize each data source (step 410). Note the data sources referred to herein are data sources in a target system from which data is to be harvested. Data in one or more data sources is then sampled to determine a likelihood of success of the data harvesting, and recommendations are made from the samples based on machine learning relating to previous runs of the data harvester (step 420). More or all remaining data can then be harvested, and a time for completion is generated (step 430). The time to completion in step 430 may include time to complete data harvesting in each data source along with an overall time to complete date harvesting in all data sources. The harvested data is then analyzed and compared to the compliance requirements (step 440). A compliance report is then generated (step 450).

Figure 5:
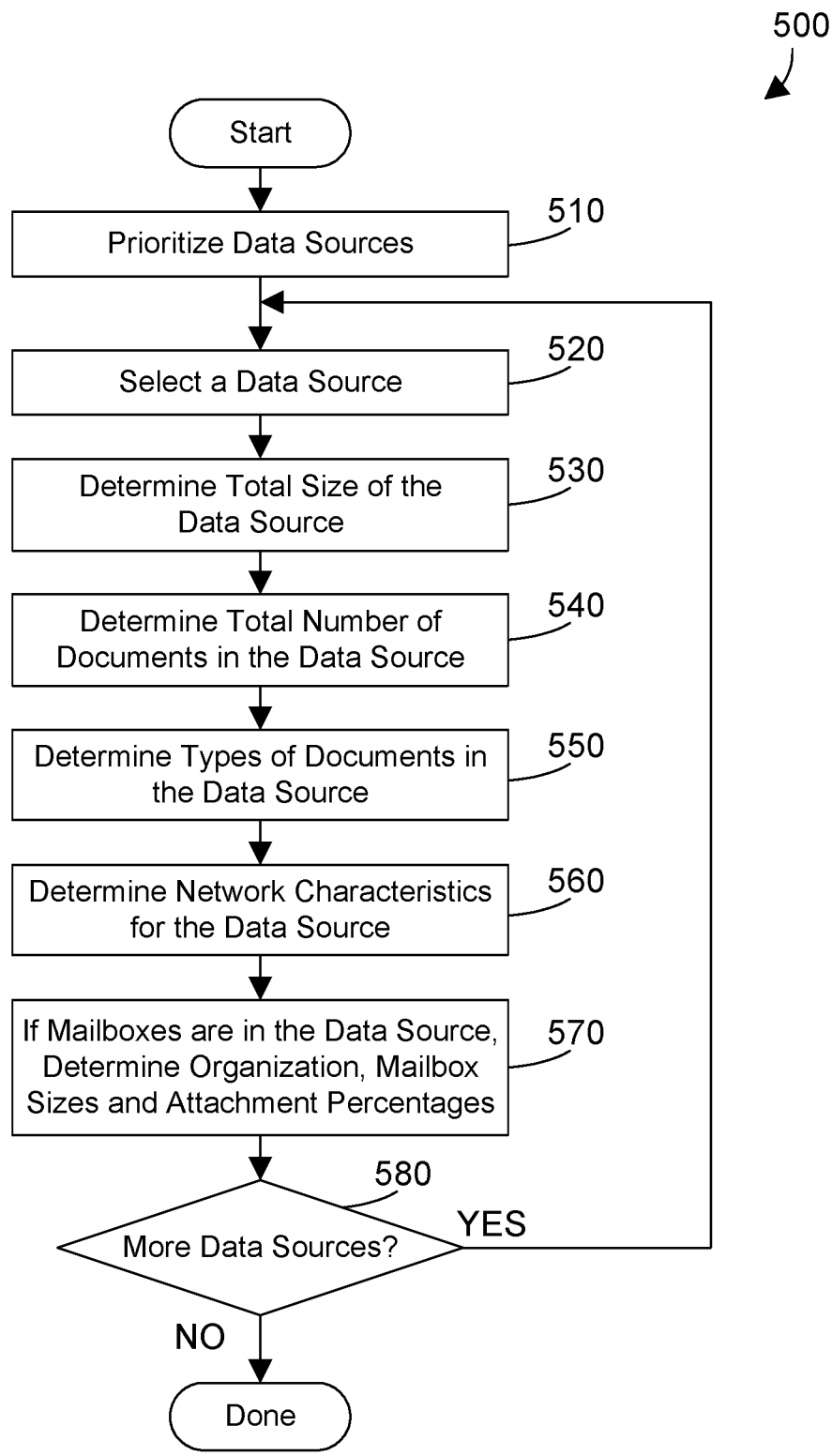
FIG. 5 is a flow diagram of a method that is one suitable implementation for step 410 in FIG. 4.

FIG. 5 shows a method 500 that is one suitable implementation for step 410 in FIG. 4. Method 500 assumes the type and number of data sources was previously determined. Data sources can be prioritized (step 510). Note the prioritization of data sources in step 510 is optional. A data source is selected (step 520). The total size of the data source is determined (step 530). The total number of documents in the data source is determined (step 540). The types of documents in the data source are determined (step 550), which can include determining average document size. The network characteristics of the data source are determined (step 560). Network characteristics determined in step 500 can include, without limitation, the connectivity and response times between different data sources and between the data harvester and the data source, the reliable connectivity, number of hops, reachability, Local Area Network (LAN) versus Wide Area Network (WAN), bandwidth, etc. If a data source includes mailboxes, the organizational structure, mailbox sizes and attachment percentages are determined (step 570). When there are more data sources (step 580=YES), method 500 loops back to step 520 so the next data source can be selected. Once there are no more data sources (step 580=NO), method 500 is done. The characterization of data sources allows more intelligently determining how fast, how much and how accurately the data harvester can find the relevant data in the data sources, and allows determining a sample size for the data source that will expedite the generation of a compliance report.

Figure 6:
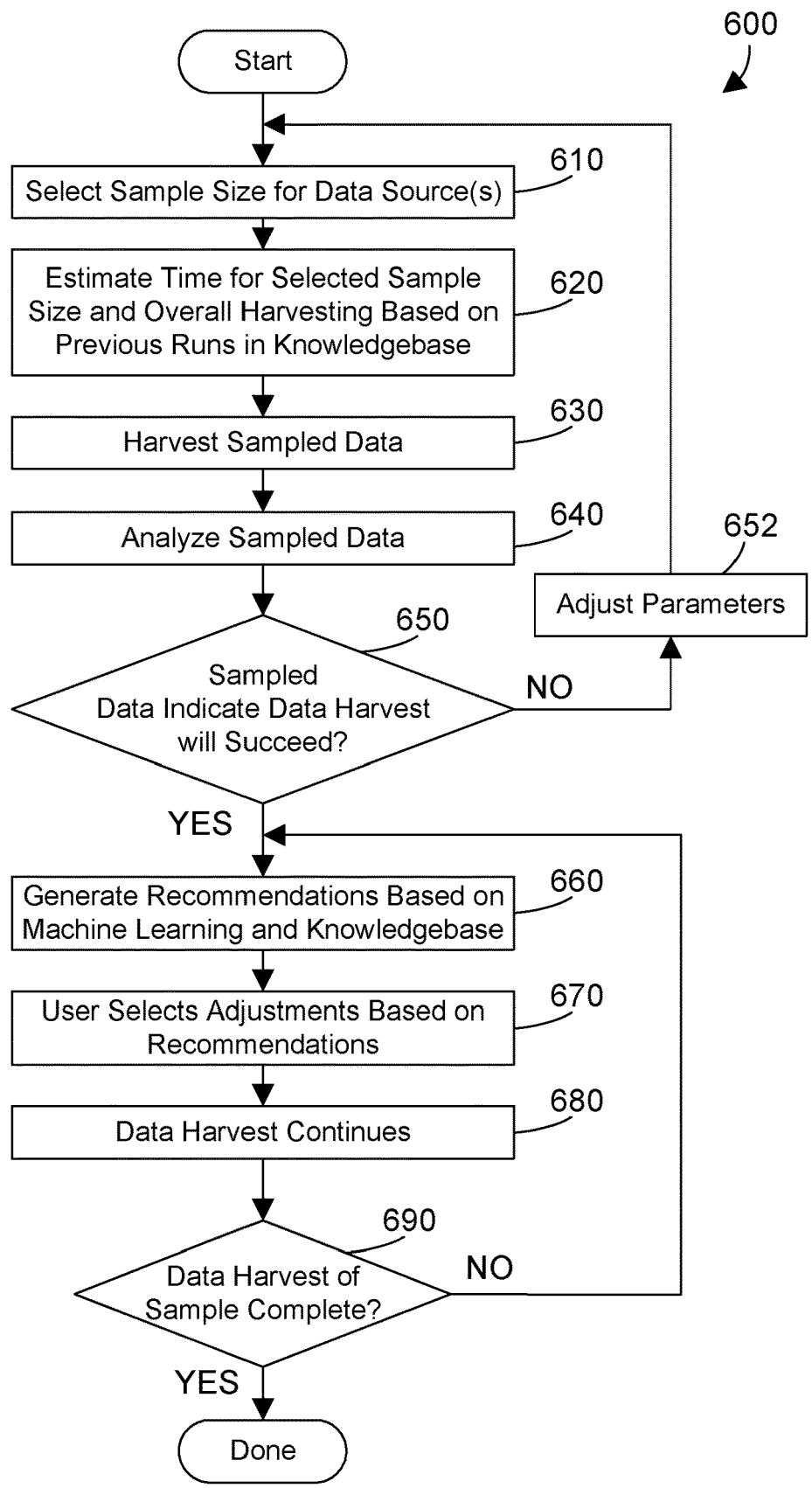
FIG. 6 is a flow diagram of a method that is one suitable implementation for step 420 in FIG. 4.

Referring to FIG. 6, a method 600 is one suitable implementation for step 420 in FIG. 4. A sample size is selected (step 610). The selected sample size in step 610 could be a sample size for a single data source, wherein method 600 is repeated for each data source, or could be a sample size for multiple data sources. The sample size selected in step 610 thus specifies a subset of data in one or more data sources. The time for harvesting the selected sample size and the overall harvesting are estimated based on previous runs stored in the historical data in the knowledgebase (step 620). The sampled data is harvested (step 630). The harvested sampled data is then analyzed (step 640). When the sampled data indicates the likelihood of success of the data harvest is below a specified threshold (step 650=NO), the parameters for the harvesting are adjusted (step 652), and method 600 loops back to step 610 and continues. An administrator can make adjustments in step 652 that include, without limitation: number of threads; number of Java Virtual Machines (JVMs); JVM heap size; sample size; number of processor cores, and number of pods. The likelihood of success of the data harvest could be below a specified threshold (step 650=NO) for a variety of reasons, including, without limitation, when there are errors in the data source, when there are excessive network errors or unreliable connectivity with a data source, when data in a data source is encrypted or password protected, or when the data source does not have any data needed by the data harvester. This allows the data harvester to predict based on adjustment of the sample size and other parameter the likelihood of success of a data harvest from only a small sample of the data in the data source, and to make dynamic adjustments until the likelihood of success is above a defined threshold.

When the sampled data indicates the likelihood of success of the data harvest is above the specified threshold (step 650=YES), recommendations based on machine learning and the historical data in the knowledgebase are generated (step 660). A user selects one or more adjustments based on the recommendations (step 670). The data harvest continues (step 680). When the data harvest is not complete (step 690=N0), method 600 can loop back to step 660 and continue, thereby iterating and providing adjustments as the harvesting of data continues. Once the data harvest of the sample is complete (step 690=NO), method 600 is done. Note that method 600 could be performed iteratively on different data sources or within different portions of a selected data source.

There are significant advantages for method 600 compared to prior art method 300 shown in FIG. 3. First, a determination can be made based on a small set of sampled data whether the data harvest will succeed, instead of doing a full harvest of all data on a data source before determining the date harvest will not succeed. Second, a Second, the data harvester can provide continuous recommendations as data harvesting proceeds based on machine learning as the data harvesting continues, allowing a user to select adjustments as needed.

Figure 7:
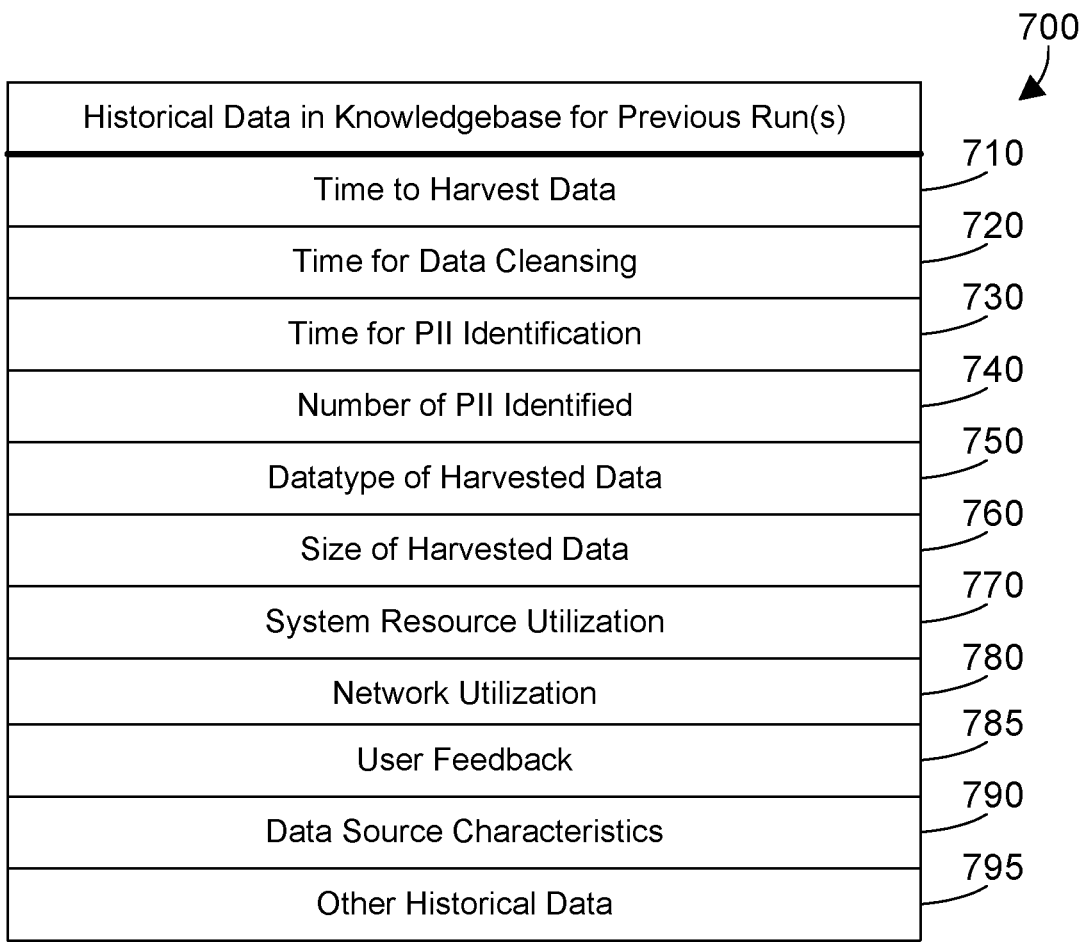
FIG. 7 shows a table showing sample historical data in a knowledgebase for previous runs of the data harvester.

FIG. 7 shows a table 700 with sample historical data, such as 127 in FIGS. 1 and 2, that could be in the knowledgebase 126 in FIGS. 1 and 2, for previous runs of the data harvester. Table 700 represents data in the knowledgebase that could be considered in step 660 in FIG. 6. The sample historical data can include, without limitation: time to harvest data 710; time for data cleansing 720; time for Personally Identifiable Information (PII) identification 730; number of PII identified 740; datatype of harvested data 750; size of harvested data 760; system resource utilization 770; network utilization 780; user feedback 785; data source characteristics 790; and other historical data 795. The historical data in table 700 can be aggregated for an overall harvesting run, or can be separate for each data source.

Figure 8:
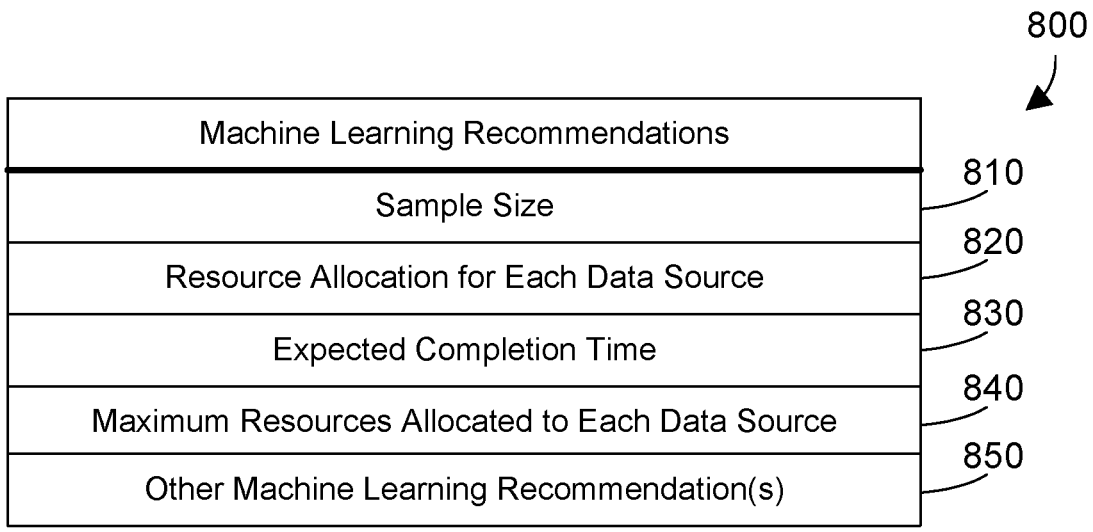
FIG. 8 shows a table of possible machine learning recommendations that can be made based on historical data such as shown in FIG. 7.

FIG. 8 shows a table 800 with some possible machine learning recommendations that could be made in step 660 in FIG. 6, which include: sample size 810; resource allocation for each data source 820; expected completion time 830; maximum resources allocated to each data source 840; and other machine learning recommendation(s) 850.

Figure 9:
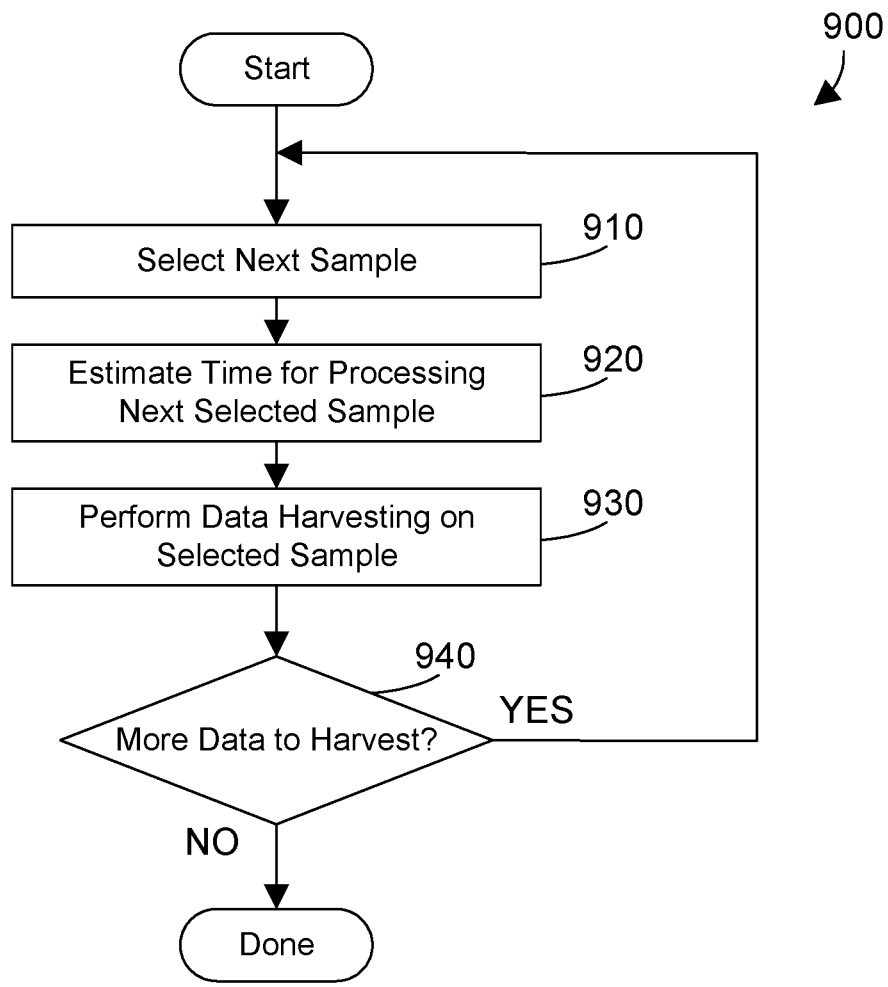
FIG. 9 is a flow diagram of a method that is one suitable implementation for step 430 in FIG. 4.

Referring to FIG. 9, a method 900 represents one suitable implementation for step 430 in FIG. 4. The next sample is selected (step 910). The next sample can be any suitable-size sample that includes any or all of the data remaining in the data source that was not included in the initial sample. The time for processing the next selected sample is estimated (step 920). The data harvesting on the selected sample is run (step 930). When there is more data to harvest (step 940=YES), method 900 loops back to step 910 and continues until there is not more data to harvest (step 940=N0). Method 900 is then done. Note that method 900 could be performed iteratively for each data source or could be performed iteratively on different portions of a selected data source.

A data harvester enhances compliance audits by characterizing data sources, sampling data in one or more of the data sources to determine likelihood of success of the data harvest, estimating time for the data harvest, making recommendations from the samples based on machine learning relating to previous runs, then sampling additional data while estimated expected completion time. The harvested data may then be analyzed and compared to compliance requirements, and a compliance report may be generated.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:
1. An apparatus comprising:
at least one computer processor;
one or more computer readable storage media; and
computer program instructions, the computer program instructions being stored on the one or more computer readable storage media for execution by the at least one computer processor, and the computer program instructions including instructions to:
perform data harvesting on a subset of data in a data source;

determine, based on data harvested from the subset of data in the data source, a likelihood that performing data harvesting on all of the data in the data source will meet one or more compliance requirements; and responsive to determining, based on the data harvested from the subset of data in the data source, a likelihood below a threshold that performing data harvesting on all of the data in the data source will meet the one or more compliance requirements:

adjust a size of the subset of data in the data source from which data harvesting is performed.

2. The apparatus of claim 1, further comprising program instructions to characterize the data source according to a plurality of the following total size of the data source;
total number of documents in the data source;
types of documents in the data source; and
network characteristics of the data source.

3. The apparatus of claim 2, further comprising, responsive to the data source including a plurality of mailboxes, program instructions to characterize the data source according to organization, mailbox sizes and attachment percentages.

4. The apparatus of claim 1, further comprising program instructions to generate, based, at least in part, on machine learning, at least one recommendation based on historical data stored in a knowledgebase regarding at least one previous data harvest run.

5. The apparatus of claim 1, further comprising program instructions to: estimate a time for processing the adjusted size of the subset of data in the data source; and perform data harvesting on any additional data included in the adjusted size of the subset of data in the data source.

6. An article of manufacture comprising software stored on a computer readable storage medium, the software comprising program instructions to:

perform data harvesting on a subset of data in a data source;

determine, based on data harvested from the subset of data in the data source, a likelihood that performing data harvesting on all of the data in the data source will meet one or more compliance requirements; and responsive to determining, based on the data harvested from the subset of data in the data source, a likelihood below a threshold that performing data harvesting on all of the data in the data source will meet the one or more compliance requirements:

adjust a size of the subset of data in the data source from which data harvesting is performed.

7. The article of manufacture of claim 6, further comprising program instructions to characterize the data source according to a plurality of the following:

total size of the data source;
total number of documents in the data source;
types of documents in the data source;
network characteristics of the data source; and
when the data source includes a plurality of mailboxes, according to organization, mailbox sizes and attachment percentages.

8. The article of manufacture of claim 6, further comprising program instructions to generate, based, at least in part, on machine learning at least one recommendation based on historical data stored in a knowledgebase regarding at least one previous data harvest run.

9. The article of manufacture of claim 6, further comprising instructions to:

estimate a time for processing the adjusted size of the subset of data in the data source; and perform data harvesting on any additional data included in the adjusted size of the subset of data in the data source.

10. A method for harvesting data, the method comprising:

performing data harvesting on a subset of data in a data source determining, based on data harvested from the subset of data in the data source, a likelihood that performing data harvesting on all of the data in the data source will meet one or more compliance requirements; and responsive to determining, based on the data harvested from the subset of data in the data source, a likelihood below a threshold that performing data harvesting on all of the data in the data source will meet the one or more compliance requirements:

adjusting a size of the subset of data in the data source from which data harvesting is performed.

11. The method of claim 10, further comprising characterizing the data source according to a plurality of the following:

total size of the data source;
total number of documents in the data source;
types of documents in the data source; and
network characteristics of the data source.

12. The method of claim 11, further comprising, responsive to the data source including a plurality of mailboxes, characterizing the data source according to organization, mailbox sizes and attachment percentages.

13. The method of claim 10, further comprising generating, based, at least in part, on machine learning at least one recommendation based on historical data stored in a knowledgebase regarding at least one previous data harvest run.

14. The method of claim 10, further comprising:

estimating a time for processing adjusted size of the subset of data in the data source; and performing data harvesting on any additional data included in the adjusted size of the subset of data in the data source.

* * * * *